Sept. 4, 1928.

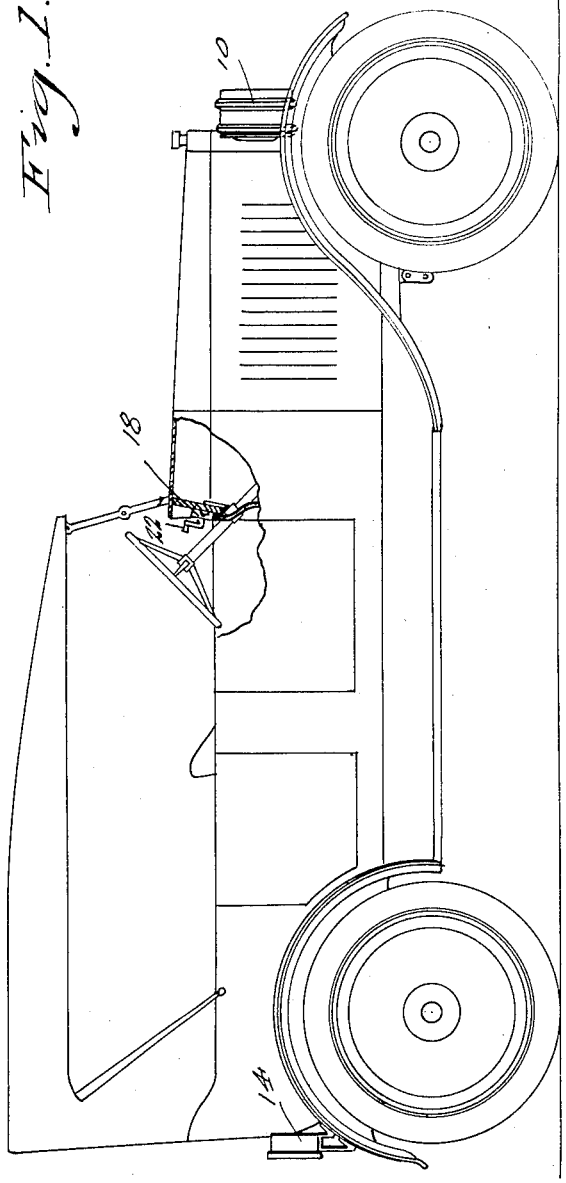

J. L. STEVENS 1,683,496

SIGNAL

Filed Feb. 13, 1925      2 Sheets-Sheet 2

J. L. Stevens INVENTOR

BY Victor J. Evans ATTORNEY

WITNESS:

Patented Sept. 4, 1928.

1,683,496

UNITED STATES PATENT OFFICE.

JOHN L. STEVENS, OF CHANDLER, ARIZONA.

SIGNAL.

Application filed February 13, 1925. Serial No. 9,008.

This invention relates to direction signals for automobiles and has for an object the provision of means mounted upon the automobile and operable to readily attract attention for the purpose of indicating a proposed change in direction of travel.

To this end, the invention provides signalling devices which are normally inactive but which when rendered active will indicate a change in the direction of travel and at the same time will extinguish the usual headlight of the automobile upon the side of the latter in the direction of the proposed turn, so as to more readily attract attention to the signal.

Another object of the invention is the provision of a direction signal which in addition to the above and other advantages may be arranged within the casings of the ordinary head lamps of the vehicle, so that it will not present an unsightly appearance, but will be prominently displayed when in use.

With the above and other objects in view, the invention further includes the following novel features and details of construction, to be hereinafter more fully described, illustrated in the accompanying drawings and pointed out in the appended claim.

In the drawings:—

Figure 1 is a side elevation of an automobile partly broken away with the invention applied.

Figure 2 is a section through the controlling device or switch.

Figure 3 is a similar view looking in the direction opposite that shown in Figure 3.

Figure 4 is an enlarged sectional view of the controlling device or signal.

Figure 5 is an elevation partly broken away showing a rear signal.

Figure 6:
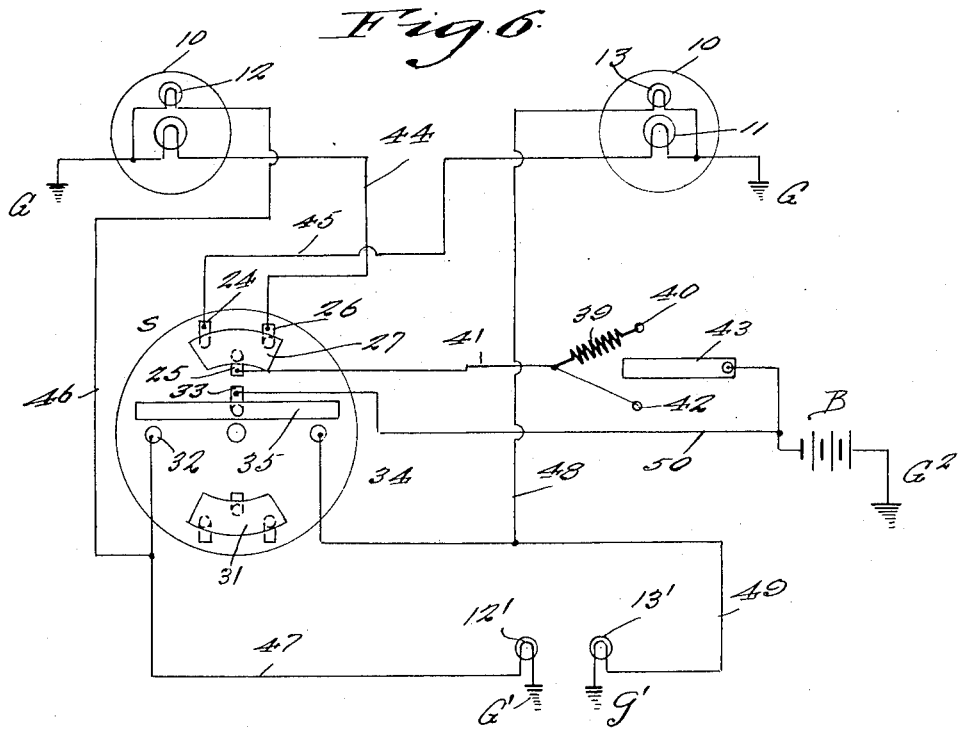
Figure 6 is a diagrammatic view illustrating the manner of connecting the signal in a lighting circuit in which the bright and dim head lamps each contains a single lamp.

Referring to the drawings in detail wherein like characters of reference denote corresponding parts, the reference character 10 indicates the usual head lamps of an automobile lighting system within the casings of which are bulbs 11 the latter receiving current from a battery B, a circuit through the lamps being controlled by the usual controlling switch of the lighting system.

The battery B also serves to supply current to the signal elements which form a part of the present invention and which are illustrated in the form of electric lamps, two of which are at the front of the automobile and two at the rear. The front lamps indicated at 12 and 13 are preferably mounted within the head lamp casings 10, while the rear lamps 12' and 13' are mounted within a casing 14. This casing is divided into separate compartments by means of a partition 15 and each compartment is covered by a glass panel, one of which is indicated at 16 and the other at 17. The signal lamps are of a distinguishing color from the lamps 11 and the rear lamps 12' and 13' are positioned preferably upon the right side of the automobile or at a distance remote from the usual tail lamp. In addition, the lamps 12 and 12' are of a different character or color from the lamps 13 and 13', so that the lamps 12 and 12' which are of a similar character or color form a pair of lamps upon one side of the automobile at the front and rear while the lamps 13 and 13' form a pair upon the other side of the automobile at the front and rear. One pair of lamps, for example the lamps 12 and 12' are preferably colored red and when illuminated indicate a left hand turn, while the lamps 13 and 13' are of a different color from the lamps 12 and 12', for example blue or green and when illuminated indicate a right hand turn. The purpose of coloring the lamps for the left hand turn red is to indicate danger, as the vehicle making a left hand turn frequently crosses the path of approaching or following vehicles.

For the purpose of controlling the signal there is provided a switch S which is preferably mounted upon the instrument board of the automobile. This switch comprises a casing 18 within which is mounted a stationary disk 19 formed of insulating material and a rotatable disk 20 also formed of insulating material. The disk 20 is mounted upon and rotates with the shaft or stem 21 which extends through the casing 18 and which has mounted upon its outer end an operating handle 22. A coiled spring 23 serves to hold the disks 19 and 20 in close contacting engagement.

The disk 19 carries spaced contacts 24, 25 and 26 arranged in a group and adapted to be engaged by a segmental contact plate 27 carried by the disk 20. The disk 19 also carries spaced contacts 28, 29 and 30 arranged in a group and adapted to be engaged by a segmental contact plate 31 carried by the disk 20. Additional contacts 32, 33 and 34 are carried by the disk 19, these last mentioned contacts being adapted to be engaged by a contact bar or strip 35 which is carried by the disk 20.

The contacts which are carried by the disk 19 are preferably in the form of pins or plungers as shown in Figure 4 of the drawings and are yieldingly urged in one direction by means of springs 36 so as to provide proper contacting engagement with the contacts of the disk 20. Rotary movement of the disk 20 in either direction is limited by means of a stop pin 37 which enters a recess 38 provided in the disk 20, the opposite end walls of this recess forming stops which engage the pin 37.

In Figure 6, the signal is shown in connection with a lighting circuit in which the lighting system includes a resistance element 39 for dimming the head lamps 11. This resistence element is connected between a contact 40 and a conductor 41, the latter being connected to the contact 25 and also to a contact 42. The contacts 40 and 42 are adapted to be engaged by a switch arm 43 so that the resistance element 39 may be included in or cut out of the lighting circuit. One of the lamps 11 is connected to the contact 26 by a conductor 44 while the other lamp is connected to the contact 24 by a conductor 45, the lamps 11 being grounded as indicated at G.

The signal lamps 12 and 12' are connected to the contact 32 by conductors 46 and 47 respectively, while the signal lamps 13 and 13' are connected to the contact 34 by conductors 48 and 49 respectively. The lamps 12 and 13 are grounded through the grounds G while the lamps 12' and 13' are connected to the grounds G'. The battery B is grounded as indicated at $G^2$.

The signal lamps may be used in connection with either the bright or dim lights, when the dim lights are used the switch arm 43 is engaged with the contact 40 so as to include the resistance element 39, while when the bright lights are used the switch arm 43 is engaged with the contact 42, as is usual. When it is desired to make a right hand turn, the operating handle 22 of the switch S is moved to the right so as to move the contact 27 in the same direction, the degree of movement cutting out the contact 24 and bridging the contacts 25 and 26 so that current will flow from the battery B through the switch arm to either the contact 40 or 42, through the conductor 41, the contacts 25, 27 and 26, the conductor 44, the left hand lamp 11, the grounds G and $G^2$ back to the battery, the right hand lamp 11 being eliminated. At the same time the bar 35 has its right hand end tilted downward so as to engage the contact 34, so that current will flow from the battery through a conductor 50 to the contact 33, the bar 35, the contact 34, the conductors 48 and 49 to the lamps 13 and 13', and back to the battery through the grounds G' and $G^2$.

Figure 7:
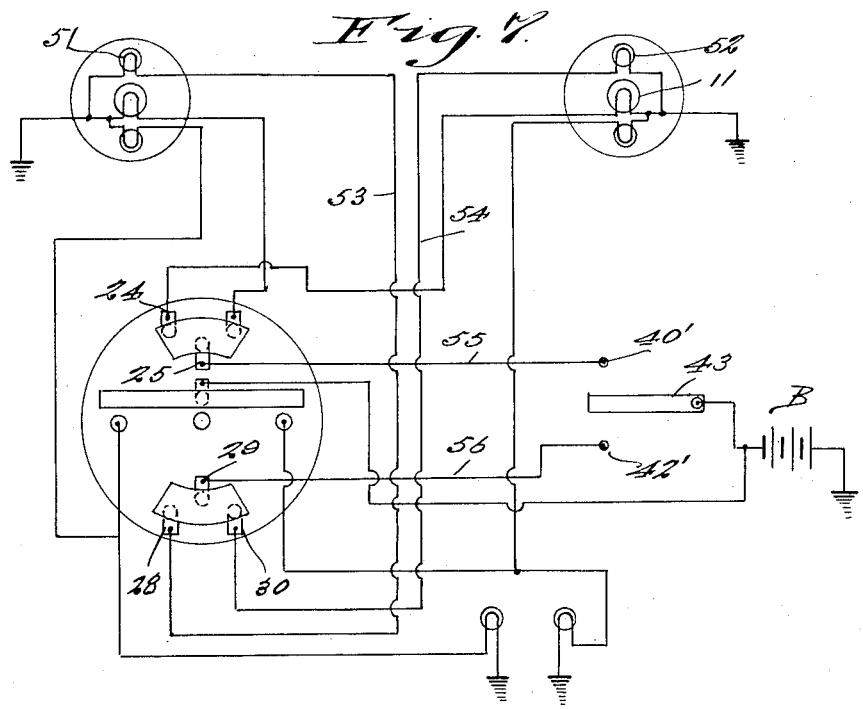
Figure 7 is a like view in which the bright and dim lamps of the lighting system contain separate bulbs.

In Figure 7 the invention is shown in connection with a lighting system having separate bright and dim lamps. The arrangement is the same as that previously described except that the resistance element 39 is omitted and the dim lamps 51 and 52 are connected by means of conductors 53 and 54 respectively with the contacts 28 and 30 respectively, while the contact 25 is connected directly with the contact 40' by means of a conductor 55. The contact 29 is connected to the contact 42' by a conductor 56. Thus by moving the switch arm 43 either the bright or dim lamps may be included in the battery circuit, while movement of the operating handle 22 to the right will eliminate either the right hand lamp 11 by uncovering the contact 24 or the right hand dim lamp 52 by uncovering the contact 30.

The invention is susceptible of various changes in its form, proportions and minor details of construction and the right is herein reserved to make such changes as properly fall within the scope of the appended claim.

Having described the invention what is claimed is: —

A switch comprising a stationary member and a rotatable member, said stationary member carrying spaced groups of relatively offset contacts, a contact plate carried by the rotatable member for each of said groups, two of said contact plates normally engaging all of the contacts of their respective groups and operable to selectively eliminate one contact of each group when the rotatable member is operated in either direction, and the remaining one of said contact plates normally engaging one contact of its group and operable when the rotatable member is turned in either direction to engage another of the contacts of its group.

In testimony whereof I affix my signature.

JOHN L. STEVENS.